United States Patent [19]

Nash et al.

[11] Patent Number: 5,155,735
[45] Date of Patent: Oct. 13, 1992

[54] PARITY CHECKING APPARATUS WITH BUS FOR CONNECTING PARITY DEVICES AND NON-PARITY DEVICES

[75] Inventors: Robert C. Nash, Chelmsford; Peter A. Morrison, Framingham, both of Mass.

[73] Assignee: Wang Laboratories, Inc., Lowell, Mass.

[21] Appl. No.: 176,801

[22] Filed: Mar. 31, 1988

[51] Int. Cl.⁵ .................. G06F 11/10; G06F 13/40; G06F 13/42
[52] U.S. Cl. .................................... 371/49.1; 395/325
[58] Field of Search .............. 371/49, 32, 49.1, 49.2; 364/200 MS File, 900 MS File; 395/325

[56] References Cited

U.S. PATENT DOCUMENTS

| | | | |
|---|---|---|---|
| 4,476,527 | 10/1984 | Clayton, IV | 395/275 |
| 4,480,307 | 10/1984 | Budde et al. | 395/325 |
| 4,528,666 | 7/1985 | Cline et al. | 371/51.1 |
| 4,621,323 | 11/1986 | Mayhew | 395/575 |
| 4,636,937 | 1/1987 | Kishi et al. | 364/191 |
| 4,825,438 | 4/1989 | Bennett et al. | 371/49.3 X |

FOREIGN PATENT DOCUMENTS

| | | |
|---|---|---|
| 0075310 | 9/1982 | European Pat. Off. . |
| 2446443 | 4/1976 | Fed. Rep. of Germany ........ 371/49 |
| 57-176437 | 10/1982 | Japan . |
| 0086845 | 2/1986 | Japan . |

Primary Examiner—Roy N. Envall, Jr.
Assistant Examiner—David Huntley
Attorney, Agent, or Firm—Michael H. Shanahan

[57] ABSTRACT

Apparatus and methods for performing parity checking in an environment in which devices which perform parity checking and those which do not are connected to the same synchronous bus. The bus includes a parity enable line, which carries a parity enable signal indicating that the device transmitting data on the bus is a parity device which provides the parity of the data it transmits, a parity line, which carries the parity of the data being transmitted, and a parity error line which carries a parity error signal indicating whether the receiving device detected a parity error. The data is transmitted in a first bus cycle, the parity enable signal and the parity are transmitted in the following bus cycle, and the receiving device transmits the parity error signal in the next bus cycle after that. The bus interface for each parity device includes a parity generator and logic which generates the parity and parity enable signals and receives the parity error signal when the parity device is transmitting and which receives the parity and parity enable signals and generates the parity error signal when the device is receiving. The apparatus is used with system diagnostic apparatus which records the occurrence of any parity error among devices attached to the bus.

8 Claims, 4 Drawing Sheets

PARITY CHECKING APPARATUS WITH BUS FOR CONNECTING PARITY DEVICES AND NON-PARITY DEVICES

BACKGROUND OF THE INVENTION

1. Field of the Invention

The invention disclosed herein relates to systems for transferring digital data and more particularly to systems which generate and check parity while transferring data.

2. Description of the Prior Art

Parity generation and checking has long been used in the computer arts to confirm the integrity of a word of data. When a word of data is transmitted from one device to another, the sending device also generates a parity value for the word and transmits a parity signal representing the parity value. The value of the parity signal indicates whether there was an even or odd number of bits in the word with the value "1". The receiving device receives the word and generates its own parity value from the received word; if that parity value is different from the one represented by the parity signal for the word the received word has an odd number of "1" bits where the transmitted word had an even number or vice-versa. Consequently, by checking parity, the receiving device can detect any change in the value of the transmitted data which involves an odd number of bits.

A difficulty with parity checking in the prior art has been upgrading from systems which did not check parity to systems that did. Even though a bus had provisions for parity checking, devices which checked parity could not do so if other devices were attached to the bus which did not perform parity checking. Consequently, no gradual upgrading of devices to perform parity checking was possible. Once a decision was made to use a bus which provided for parity checking, all devices which were to be attached thereto had to be upgraded to perform parity checking at the same time.

A further difficulty with parity checking in the prior art has been that the generation of a parity value requires time, and consequently, devices which performed parity checking required longer bus cycles than devices which did not. The addition of parity checking thus slowed the whole system down. Moreover, the requirement for bus cycles longer than those for devices that did not parity check further aggravated the problem of connecting both types of devices to the same synchronous bus.

Another difficulty with parity checking has been that the transmitting and receiving devices have known that there was a parity error, but there has been no simple mechanism for determining independently of the transmitting and receiving devices that a parity error had occurred during the transmission. It is an object of the apparatus and methods disclosed in the present application to solve these problems and others as well.

SUMMARY OF THE INVENTION

The present application discloses a bus, bus interface apparatus, and methods which permit devices which perform parity checking and devices which do not to be used together. The bus transfers data between devices including one or more parity devices and one or more non-parity devices and includes one or more data lines connected to all of the devices for transferring a word of data between a transmitting device and a receiving device and parity lines connected only to the parity devices and including a parity enable line for transmitting a parity enable signal from a transmitting parity device indicating that the transmitting device is a parity device, a parity line for transmitting a parity signal from a transmitting parity device indicating the parity at the transmitting parity device of a word transmitted on the data lines, and a parity error line for transmitting a parity error signal from a receiving parity device indicating whether the parity of the transferred word at the receiving parity device was the same as the parity of the transferred word at the transmitting parity device.

Another aspect of the bus disclosed herein is that the bus is synchronous and the parity checking is pipelined. A transmitted data word is transmitted from the transmitting parity device in a first bus cycle, the parity enable signal and the parity of the transmitted data word are transmitted from the transmitting parity device in the next bus cycle, and if a parity error is detected by the receiving device, a parity error signal is transmitted by the receiving device in the bus cycle following the next bus cycle.

The bus interface apparatus disclosed herein interfaces a parity device to a bus for transferring data between devices including one or more parity devices and one or more non parity devices. The bus interface apparatus includes parity enable signal generating means operably coupled to a parity enable line of the bus for operating when the parity device has transmitted a data word to provide a parity enable signal indicating that the parity device is such to the parity enable line; parity generation means operably coupled to data lines of the bus for generating the parity of data words provided to the data lines by the parity device or received from the data lines by the parity device; parity signal providing means coupled to the parity generation means and operably coupled to a parity line of the bus for operating when the parity device has transmitted a data word to receive the parity of the transmitted data word from the parity generation means and provide a parity signal indicating the received parity on the parity line; parity error signal providing means coupled to the parity generation means and operably coupled to the parity line, to the parity enable signal line, and to a parity error line of the bus for operating when the parity device is receiving a data word transmitted from another parity device to receive the parity of the received data word from the parity generation means and to respond to the parity enable signal and the parity signal by comparing the parity of the received data word with the parity indicated by the parity signal and generating a parity error signal on the parity error line if that parity and the parity of the received data word do not match; and parity error signal receiving means operably coupled to the parity error line for operating when the parity device has transmitted a data word to receive any parity error signal generated by the parity error signal providing means of the other parity device upon receiving the transmitted data word.

It is thus an object of the invention to provide improved methods and apparatus for transmitting digital data.

It is another object of the invention to provide improved methods and apparatus for checking parity.

It is an additional object of the invention to provide parity checking methods and apparatus which permit devices which check parity to be used on the same bus with devices which do not check parity. It is a further object of the invention to provide apparatus and methods for checking parity which do not slow down the transmission of data.

It is a still further object of the invention to provide apparatus for use on a bus to indicate the occurrence of any parity error on the bus.

These and other object of the present invention will be understood by those of ordinary skill in the art after referring to the detailed description of a preferred embodiment and the drawing, wherein:

Figure 1:
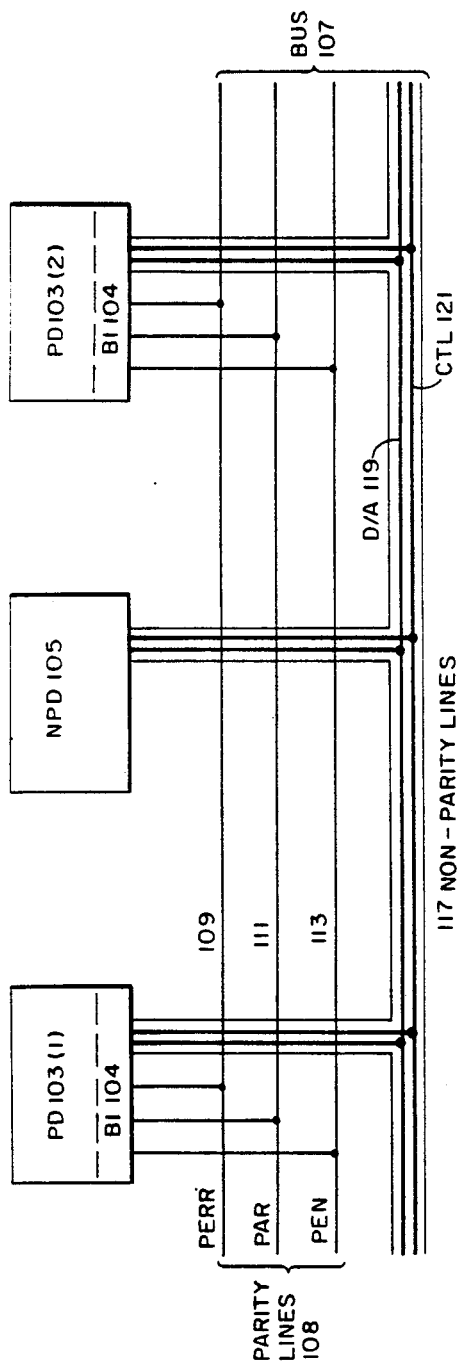
FIG. 1 is an overview of the parity checking system.

Reference numerals in the figures have three digits: the most significant digit is the number of the figure in which the item specified by the reference numeral first appears; the remaining two digits are the number of the item in the figure. Thus, the item identified by the reference number 103 first appears a item 3 in FIG. 1.

DETAILED DESCRIPTION OF A PREFERRED EMBODIMENT

The following Detailed Description of a Preferred Embodiment of the present invention will begin with an overview of the invention and its operation, continue with a description of the bus interface employed to implement the present invention and a detailed description of the parity logic used in the bus interface, and close with a description of a diagnostic system incorporating the invention.

Figure 2:
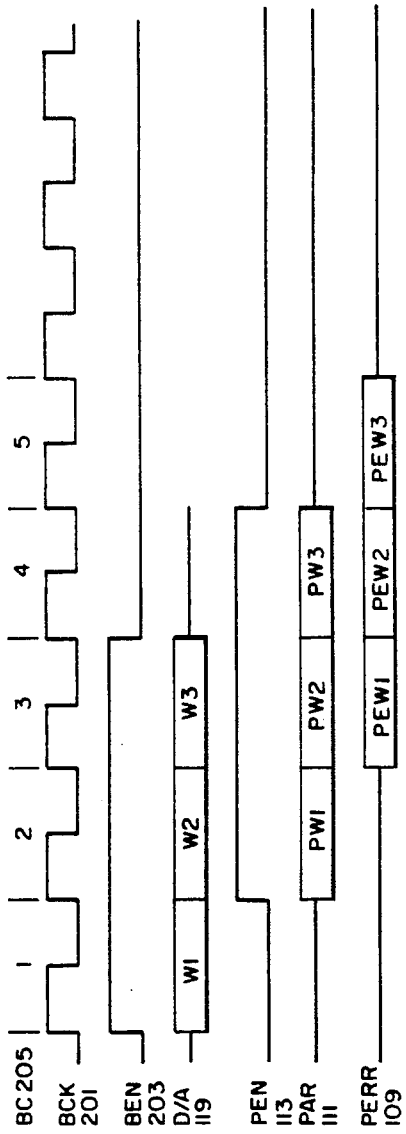
FIG. 2 is a timing diagram for the parity checking system.

1. Overview of the Invention: FIGS. 1 and 2

FIG. 1 shows a system 101 in which parity devices (PD) 10 which generate parity and detect parity errors are connected to bus 107 together with non-parity devices (NPD) 105 which neither generate parity nor detect parity errors. In a preferred embodiment, devices 103 and 105 may be microprocessor-controlled I/O controllers which connect I/O devices such as disk drives, workstations, or communications ports to bus 107. Bus 107 is a bus for transferring data and/or addresses between attached devices. Bus 107 is coupled to a bus interface in each of the attached devices. The present discussion concerns itself only with bus interface 104 in the parity devices. In a preferred embodiment, bus 107 has two main components: non parity lines 117, which are connected to both parity devices 103 and non parity devices 105, and parity lines 108, which are connected only to parity devices 103. Non parity lines 117 in a preferred embodiment include data-/address lines (D/A) 119, which carry data including data words and address words, and control lines 121, which carry control signals including a bus clock signal. Non parity lines 117 in a preferred embodiment are described in a degree of detail which is not relevant to the present invention in U.S. patent application Ser. No. 750,112, *I/O Structure for an Information Processing System*, Fu, et al., filed Jun. 28, 1985. Non parity lines 117 may, however, be implemented using any synchronous bus which does not include parity lines.

There are three parity lines 108. When a parity device 103(1) is transmitting data on data/address lines 119, two of the lines, parity enable (PEN) 113 and parity (PAR) 111, carry signals generated by the transmitting parity device. The signal carried by parity enable line 113 is a parity enable signal which indicates that the sending parity device 103(1) does parity generation; the signal carried by parity line 111 indicates the parity of the las word of data transmitted by parity device 103(1) on data/address lines 119. When a parity device 103(2) is receiving data, it also receives signals on parity enable line 113 and parity line 111, and in response to those signals and the parity of the data received on data/address lines 119, bus interface 104 generates a parity error signal on parity error line 109 indicating whether the parity of the data received in parity device 103(2) was the same as that indicated by the signal received on parity line 111. The transmitting parity device 103 receives the parity error signal on parity error line 109 in in bus interface 104. Thus, if a bit of the data word transmitted by parity device 103(1) on bus 107 changed during the transmission, receiving parity device 103 can detect the change and can inform transmitting parity device 103(1) of the error by means of a signal on parity error line 109.

Either or both of the parity devices may respond to the detection of a parity error. For example, receiving parity device 103 may respond to the detection by discarding the data in which the error occurred and transmitting parity device 103 may retransmit the data in which the error occurred. In addition, as will be described in more detail hereinafter, parity lines 108 may be used to provide information on parity errors to the diagnostic system of the digital computer system in which bus 107 and devices 103 and 105 are employed.

While transmission of a data word, generation of a parity enable signal on parity enable line 113, generation of a parity signal for the transmitted data word on parity 111, reception of the data word and the signals, and generation of any parity error signal on parity error line 109 may all take place in a single bus cycle, the rate of data transfer can be enhanced by "pipelining" parity processing. In pipelined parity processing, data word transmission, parity determination, parity transmission, parity error checking, and parity error signal sending are overlapped. FIG. 2, a timing diagram for the system of FIG. 1, shows the pipelining in a preferred embodiment.

FIG. 2 shows the timing involved in a two word data write operation. The operation of the bus and of the attached devices 103 or 105 is synchronized by means of bus clock (BCK) signal 201, which is carried on one of the lines of CTL 121. Each rising edge of BCK 201 marks the beginning of a new bus cycle (BC 205). In the two-word data write operation, the address at which the data is to be written and the two words of data are transferred over data/address lines in three successive bus cycles 205. The data write operation begins in parity device 103(1) which is the source of the data. When parity device 103(1) has data to transmit via bus 107, it competes with other devices 103 or 105 to gain access to the bus. When device 103(1) has gained access, it generates a bus enable signal (BEN) 203 which controls output of data on D/A lines 119. Thus, in FIG. 2, BEN 203 is high for three bus cycles 205. During BC 205(1), parity device 103(1) outputs the address on data/address lines 119; during BC 205(2), it outputs the first data word; during BC 205(3) it outputs the second data word. During BC 205(1), parity device 103(1) further computes the parity of the address output; during BC 205(2), parity device 103(1) raises parity enable line (PEN) 113 to indicate that it is a parity device. The parity of each of the words being sent must be checked, so PEN 113 remains high for the next three cycles, or until BC 205(4). During BC 205(2), parity device 103(1) sends a parity signal on parity line (PAR) 111 which indicates the parity of the address sent on data/address lines 119 in BC 205(1); during BC 205(3), the parity signal indicates the parity of the first data word; during BC 205(4), the parity signal indicates the parity of the second data word; thus, the parity of a word output to data/address lines 119 is always output to PAR 111 one bus cycle 205 after the word itself has been output.

During BC 205(1), receiving parity device 103(2) receives the address on data/address lines 119. During BC 205(2), receiving parity device 103(2) computes the parity of the received address and receives a parity enable signal on parity enable line 113 indicating that parity device 103(1) is a parity device 103 and a parity signal indicating the parity computed by transmitting parity device 103(1) on PAR 111. During BC 205(3), receiving parity device 103(2) responds to the parity enable signal by comparing the transmitted parity and the computed parity and outputs the result of the comparison on parity error line (PERR) 109. Receiving parity device 103(2) behaves in the sam fashion with regard to the following words on data/address lines 119 and parity signals on parity line 111, and consequently, parity error line 109 indicates whether there was a parity error for the first data word in bus cycle 205(4) and whether there was a parity error for the second data word in bus cycle 205(5), or always on the second bus cycle 205 following the bus cycle 205 in which the word was transmitted.

In addition to indicating a parity error on parity error line 109, receiving parity device 103(2) records the error in a status register; when transmitting parity device 103(1) receives a signal on parity error line 109 indicating a parity error, parity device 103(1) also records the error in a status register. The status registers are monitored in a preferred embodiment by microprocessors which control the parity devices 103, and when a parity error is recorded in the status registers, receiving parity device 103(2) discards the received words, while transmitting parity device 103(1) repeats the transmission. If the error recurs after several retries, the microprocessors in the transmitting and receiving parity devices may take other remedial action such as notifying other system components of the problem.

Of course, data may also be transferred on bus 107 between a transmitter which is a non parity device 105 and a receiver which is a parity device 103 or between a transmitter which is a parity device 103 and a receiver which is a non parity device 105. In the first case, transmitting non parity device 105 is not connected to parity lines 108; consequently, receiving parity device 103 never receives a parity enable signal on parity enable line 113, never compares the parity of the received word with the parity signal on PAR 111, and never produces an error signal on PERR 109. In the second case, receiving non parity device 105 is again not connected to parity lines 108 and consequently neither responds to signals on parity line 111 or parity enable line 113 nor produces signals on PERR 109. Thus, as far as transmitting parity device 103 is concerned, no parity errors ever occur on transmissions to non parity devices 105.

Figure 3:
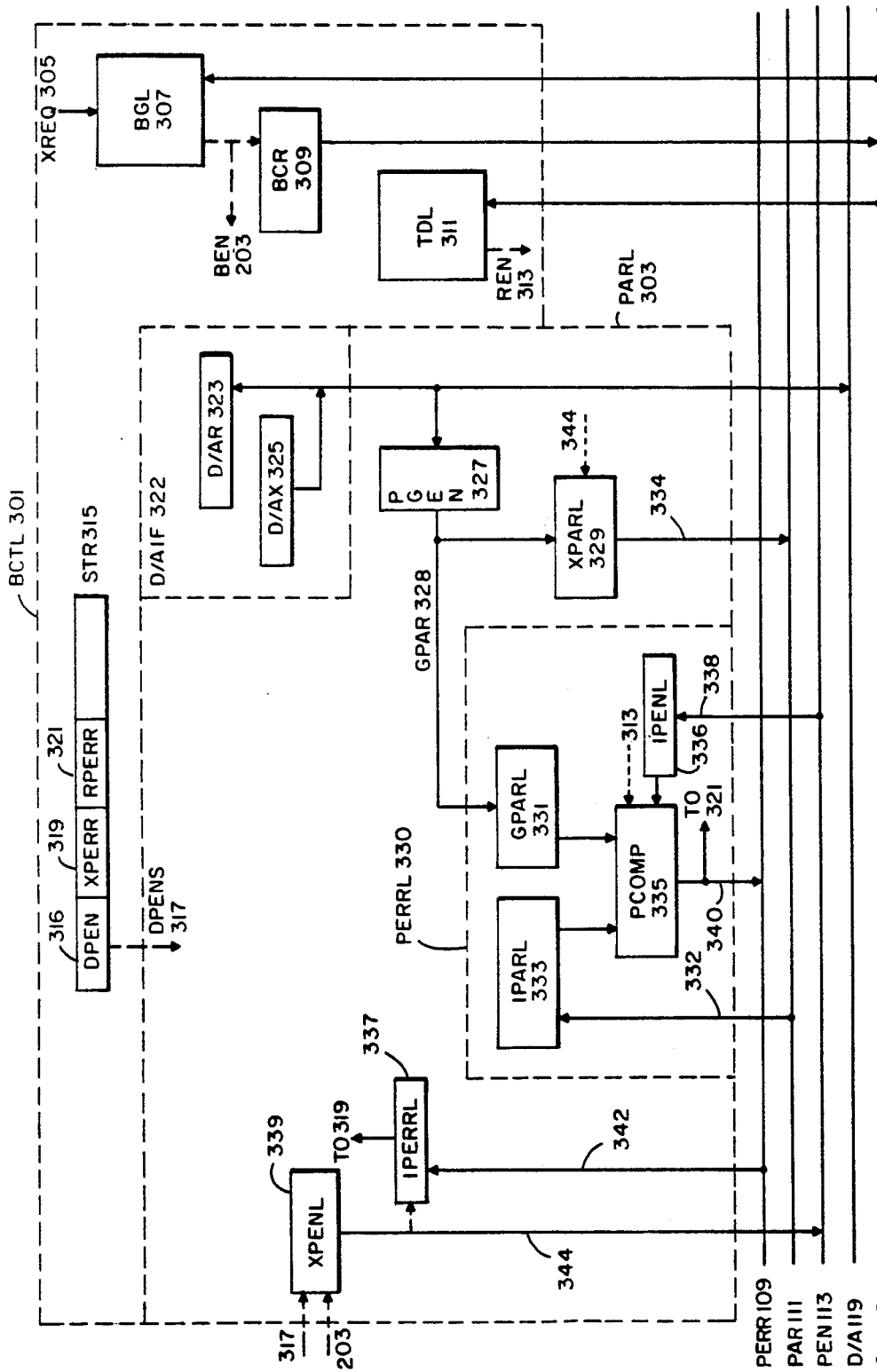
FIG. 3 is a block diagram of a bus interface in a parity device in the parity checking system.

2. Detailed Description of Bus Interface 104: FIG. 3

FIG. 3 is a block diagram of bus interface 104 in a parity device 103. Bus interface 104 has three major components: a bus control portion (BCTL) 301, which controls the interaction between priority device 103 and the bus, a data/address interface (D/A IF) 322, which is the interface for data and addresses transferred to or from parity device 103, and parity logic (PARL) 303, which generates the signals for parity lines 108.

Beginning with bus control 301, that portion of interface 104 has four components of interest: bus grant logic 307, bus control register 309, target detection logic 311, and status registers 315. Bus grant logic 307 is connected to priority lines in control lines 121 and responds to a transmit request (XREQ) signal 305 from the microprocessor which controls parity device 103 and to the state of the priority lines by generating bus enable signal 203 when parity device 103 may have access to bus 107. Bus control register 309 is loaded by the microprocessor with bits specifying bus commands which are output to lines in control 121 when bus enable signal 203 indicates that parity device 103 has access to bus 108. Target detection logic 311 is connected to control lines 121. Logic 311 monitors lines in control lines 121 to determine whether parity device 103 is the recipient of a transmission on bus 108, and when it is, logic 311 generates receive enable signal 313.

Status register 315 contains status information which is is settable and readable by the microprocessor which controls operation of parity device 103. Three bits in the status register are of particular interest in the present context. Device parity enable bit (DPEN) 316 indicates whether device 103 is a parity device and is the source of device parity enable signal 317. Transmit parity error (XPERR) 319 is set when parity device 103 has transmitted a word and received a parity error signal on PERR lines 109 from the receiver. Receive parity error (RPERR) 321 is set when parity device 103 has received a word and detected a parity error. In a preferred embodiment, when XPERR 319 or RPERR 321 indicates a parity error after a transmission or reception of data, the microprocessor controlling operation of parity device 103 resets XPERR 319 or RPERR 321 in the course of dealing with the parity error.

Continuing with data/address interface 322, this portion of bu interface 104 consists of registers which ar connected to data/address lines 119 of bus 107. The registers serve to store data or addresses transmitted to or received from data/address lines 107. In a preferred embodiment, there are separate registers for transmitting and receiving data. D/AX register 325 contains data or addresses which are output to bus 108 in response to bus enable signal 203; D/AR register 323 contains data which is written into the register in response to receive enable signal 313.

Parity logic 303, finally, has the following components: transmit PEN logic (XPENL) 339 produces the parity enable signal on parity enable line 113 when device 103 is transmitting words on the bus. XPENL 339 produces the parity enable signal in response to device parity enable signal 317 indicating that device 103 is a parity device and to bus enable signal 203. XPENL 339 further includes a latch to delay the parity enable signal so that it is output to PEN line 113 one bus cycle 205 after bus enable signal 203 is asserted and the word being transmitted is output to bus 108. Input parity error logic (IPERRL) 337 is connected to parity error line 109. When device 103 is transmitting to another parity device 103 and the receiving parity device 103 generates a parity error signal on PERR 109, IPERRT. 337 detects the error and sets XPERR 319 in status registers 315. Operation of IPERRL 337 is enabled by the parity enable signal output from XPENL 339 to PEN line 113. A latch in IPERRL 337 retains the value of the parity enable signal for one bus cycle 205 after the parity enable signal was output to bus 108.

Parity generator (PGEN) 327 is connected to data-/address lines 119 and generates a parity value for every word which is transmitted from or received in parity device 103. PGEN 327 outputs the parity value on GPAR 328. In a preferred embodiment, PGEN 327 includes a latch which delays output of the parity value for a given word on GPAR 328 until one bus cycle 205 after the word has been output to or received from bus 108. The output from PGEN 327 is received in transmit parity logic (XPARL) 329 and parity error logic (PERRL) 330. Transmit parity logic 329 is enabled to output the parity value received from PGEN 327 to parity line 111 by the parity enable signal output from XPENL 339 on line 344. The parity signal thus appears on parity line 111 in the same bus cycle as does the parity enable signal.

Parity error logic 330 detects parity errors and generates the parity error signal on parity error lines 109. The components of parity error logic 330 include input parity enable logic (IPENL) 336, input parity latch (IPARL) 333, generated parity latch (GPARL) 331, and parity comparator (PCOMP) 335. Input parity enable logic is connected to parity enable line 113 and includes a latch which retains the value of the parity enable signal received on that line. Input parity latch 333 is a latch which is connected to parity line 111, receives and retains the present value of the parity signal on that line, and outputs the retained value to parity comparison 335. Generated parity latch 331 is a latch which retains the value of GPAR 328 and outputs the retained value to parity comparison 335. Parity comparison 335 is enabled by a signal from IPENL 336 and receive enable signal 313 when parity device 103 is receiving words on data/address lines 109 and IPENL 336 has received a parity enable signal on PEN 113. Parity comparison 335 compares the outputs of IPARL 333 and GPARL 331, and when they are different, i.e., when the parity of the data word changed in the course of transmission, outputs the parity error signal to PERR 109.

Operation of bus interface 104 is as follows when parity device 103 is transmitting data. Before transmission begins, D/AX 325 is loaded with the words to be transmitted and transmit request 305 is asserted. When bus grant logic 307 determines that parity device 103 may have access to bus 109, bus grant logic 307 generates bus enable signal 203. In response to that signal, bus control register 309 outputs a bus command to control lines 121 and D/AX 325 outputs the first word to be transmitted to data/address lines 119. As the word is output, PGEN 327 generates the word's parity, which appears after one bus cycle on GPAR 328. At the same time, XPENL 339 outputs the parity enable signal to parity enable line 113 and XPARL 329 outputs the parity value at parity line 111. Two bus cycles after the first word is output, IPERRL 337 is enabled to receive any parity error signal corresponding to the word on PERR 109. If such a signal is received, XPERR 319 is set to reflect that fact. If a transmission involves more than one word, transmitting parity device 103 operates as described above for each word transmitted.

When parity device 103 is receiving data, operation of bus interface 104 is in this manner: when a word is sent to device 103, that fact is detected by TDL 311, which outputs receive enable signal 313. In the first cycle of the transmission, the received word goes to D/AR 323 and to PGEN 327. In the second cycle, PGEN 327 generates the parity for the received data on GPAR 328. That same cycle, IPARL 333 has received the parity value sent by the transmitting parity device 103 on parity line 111 and IPENL 336 the parity enable signal sent by the transmitting parity device 103 on parity enable line 113. In the third cycle after the beginning of the transmission, PCOMP 335 is enabled in response to REN 313 and a signal generated by IPENL 336 to make the comparison and output the result via line 340 to parity error line 109. If the result indicates an error, RPERR 321 is further set to indicate the error. A parity device 103 which is receiving more than one word operates as just described for each received word.

Figure 4:
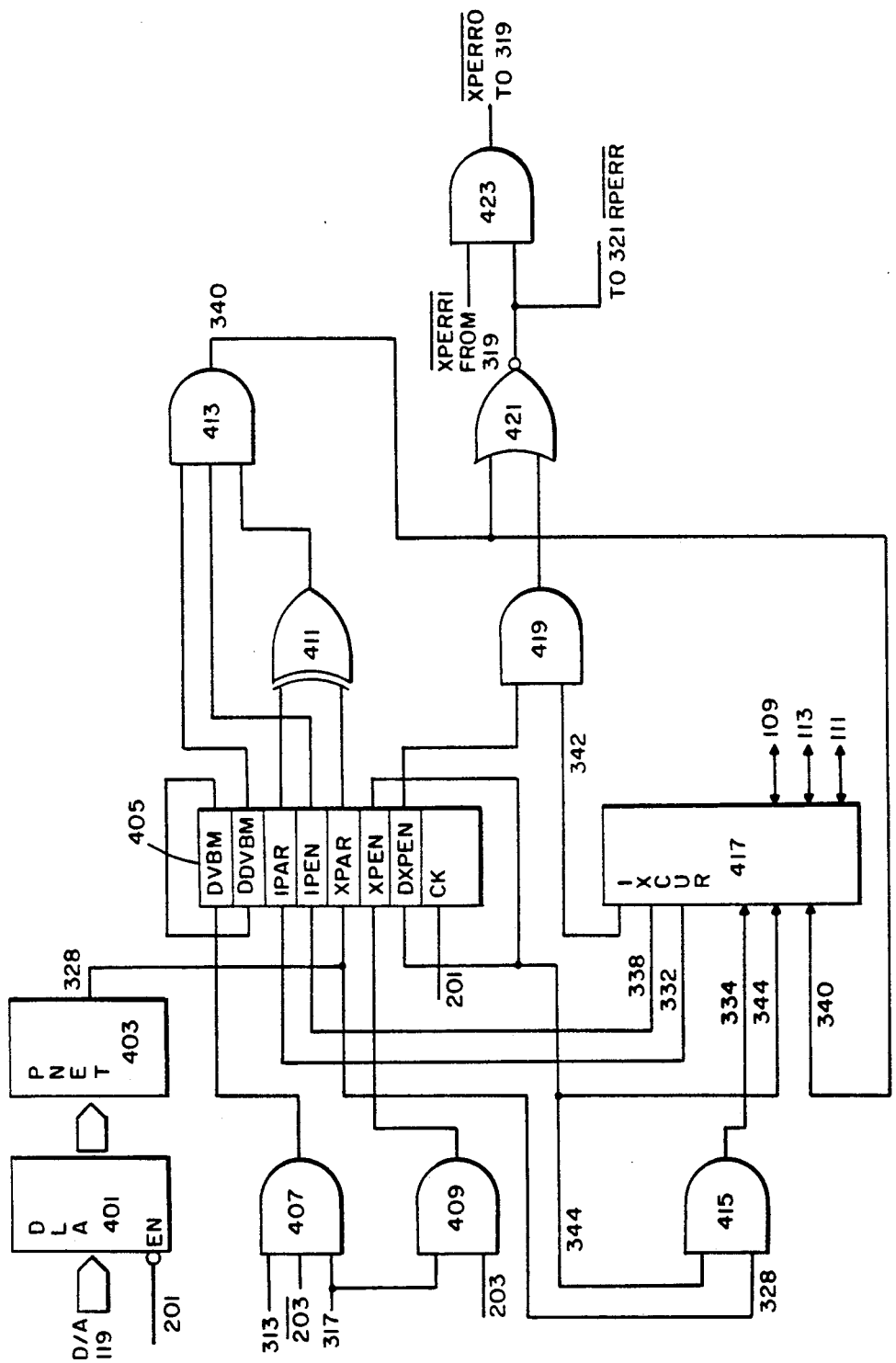
FIG. 4 is a logic diagram of the parity logic in the bus interface.

3. Detailed Description of Parity Logic 303: FIG. 4

FIG. 4 is a logic diagram which shows a presently preferred embodiment of parity logic 303. As previously described, parity logic 303 receives bus enable signal 203, receive enable signal 313, and device parity enable signal 317 as control inputs, receives data and addresses from data/address bus 119, a clock signal from control lines 121, and receives parity, parity enable, and parity error signals from and outputs them to parity lines 108. In addition to AND gates 407, 409, 413, 415, 419, and 423, XOR gate 411, and NOR gate 421, parity logic 303 includes data latch 401, which receives data from data/address lines 119, parity network 403, which receives the data latched in latch 401, determines its parity, and outputs the result as GPAR 328, latches 405, which contains the latches used to provide proper signal timing, and transceiver (XCVR) 417, which both receives signals from parity lines 108 and outputs signals to those lines. XCVR 417 drives the value of any active input it receives from parity device 103 onto the corresponding parity line 108; if the input is not active and the corresponding parity line is, XCVR 417 drives the value of the parity line into parity device 103. Data is clocked into both data latch 401 and latches 405 in response to rising edges of clock signal 201.

Parity logic 303 operates in the following fashion: whenever a word appears on data/address lines 119, data latch 401 responds to bus clock signal 201 by latching the word. During the bus cycle 205 in which the data was latched, parity net 403 computes the parity of the latched word and outputs the result on GPAR 328. At the beginning of the next bus cycle, the result is latched into XPAR in latches 405, which thus always contains the parity of the word to appear on data/address lines 119 in the preceding bus cycle 205.

If parity device 103 is transmitting data, the word which appeared on data/address lines 119 was transmitted by parity device 103. In that case also, bus enable signal 203 and device parity enable signal 317 are both active. In response to those signals, AND gate 409's output is active. The output of AND gate 409 is latched into XPEN in latches 405 at the beginning of the cycle following the cycle in which the data was transmitted. At that same time, the output of PNET 403, GPAR 328 is carrying the parity of the transmitted word. AND gate 415 has as its inputs line 328, the output of PNET 403, and line 344, the output of XPEN. If line 344 is active, indicating that parity device 103 is a parity device, the output of AND gate 415, line 334, during the cycle after the data was transmitted, is determined by the value of line 328, i.e., by the parity of the transmitted data. Line 334 is connected to XCVR 417, which transmits the parity value on PAR 111. The output of XPEN, line 344, is further connected to XCVR 417, which transmits the value of XPEN as the parity enable signal on line 113. Since XPEN is set by the output of gate 409, line 344 will go inactive one bus cycle after bus enable signal 203 goes inactive.

During transmission of data, receive enable signal 313 is inactive. Consequently, AND gate 407 has an inactive output and latch DVBM in latches 405 is set low. At the beginning of the next bus cycle after DVBM is set low, DDVBM is also set low. The output of that latch serves as an input to AND gate 413, which has as its output the parity error signal on line 340. Thus, as long as parity device 103 is transmitting, line 340 is inactive. If there is a parity error on the transmission, transmitting parity device 103 will receive a parity error signal on parity error line 109. Since line 340 is inactive, the parity error signal on line 109 drives line 342, which is an input of AND gate 419. AND gate 419's other input is latch DXPEN, which is set and reset one bus cycle 405 after latch XPEN is set. Thus, parity device 103 can receive a parity error signal in the third cycle after the beginning of the transmission. At that point, if PERR line 109 is active, indicating a parity error, the output of AND gate 419 is active and the output of NOR gate 421 is inactive. The output of that gate is the inverted value of RPERR 321, NOT RPERR, and goes to AND gate 423 and after inversion to RPERR 321 in status register 315. AND ate 423 also receives NOT XPERRI, the inverted value of XPERR 319 and outputs NOt XPERRO, which is inverted and stored in XPERR 319. Consequently, if XPERR 319 is not set and parity device 103 is not transmitting, a received parity error results in NOT XPERRO being inactive, setting XPERR 319. Once XPERR is set, NOT XPERRI remains inactive until the microprocessor resets XPERR 319.

When parity device 103 is receiving data, NOT BEN 203, REN 313, and DPENS 317 are all active. Consequently, AND gate 407's output is active, setting latch DVBM. One bus cycle 205 later, latch DDVBM is set from latch DVBM. At the same time, BEN 203 is inactive, resetting latch XPEN, which in turn keeps lines 334 and 340 inactive, so that receiving parity device 103 outputs no parity enable or parity signals on lines PEN 113 or PAR 111 respectively. This being the case, when the parity enable signal from the transmitting parity device 103 appears on PEN line 113, XCVR 417 outputs it on line 338, which sets latch IPEN in latches 405. Similarly, when the parity signal appears on PAR line 111, XCVR 417 outputs it on line 332, which sets latch IPAR in latches 405. These latches are set in the bus cycle 205 following the cycle in which the data was transmitted. As previously explained, the latch XPAR is set in the same bus cycle to the parity value for the word received in parity device 103. Thus, at the beginning of the next following cycle, DDVBM is set, IPEN is set, IPAR contains the parity value received on parity line 111, and XPAR contains the value computed from the received word. The outputs of DDVBM and IPEN serve as inputs to AND gate 413. The third input comes from XOR gate 411, whose inputs are IPAR and XPAR. If IPAR and XPAR do not have the same value, which is possible only if there is a parity error, the output of XOR gate 411 is active and the output of AND gate 413, line 340, is active, generating a parity error signal on PERR 109 and setting XPERR 319 and RPERR 321 as previously described.

Figure 5:
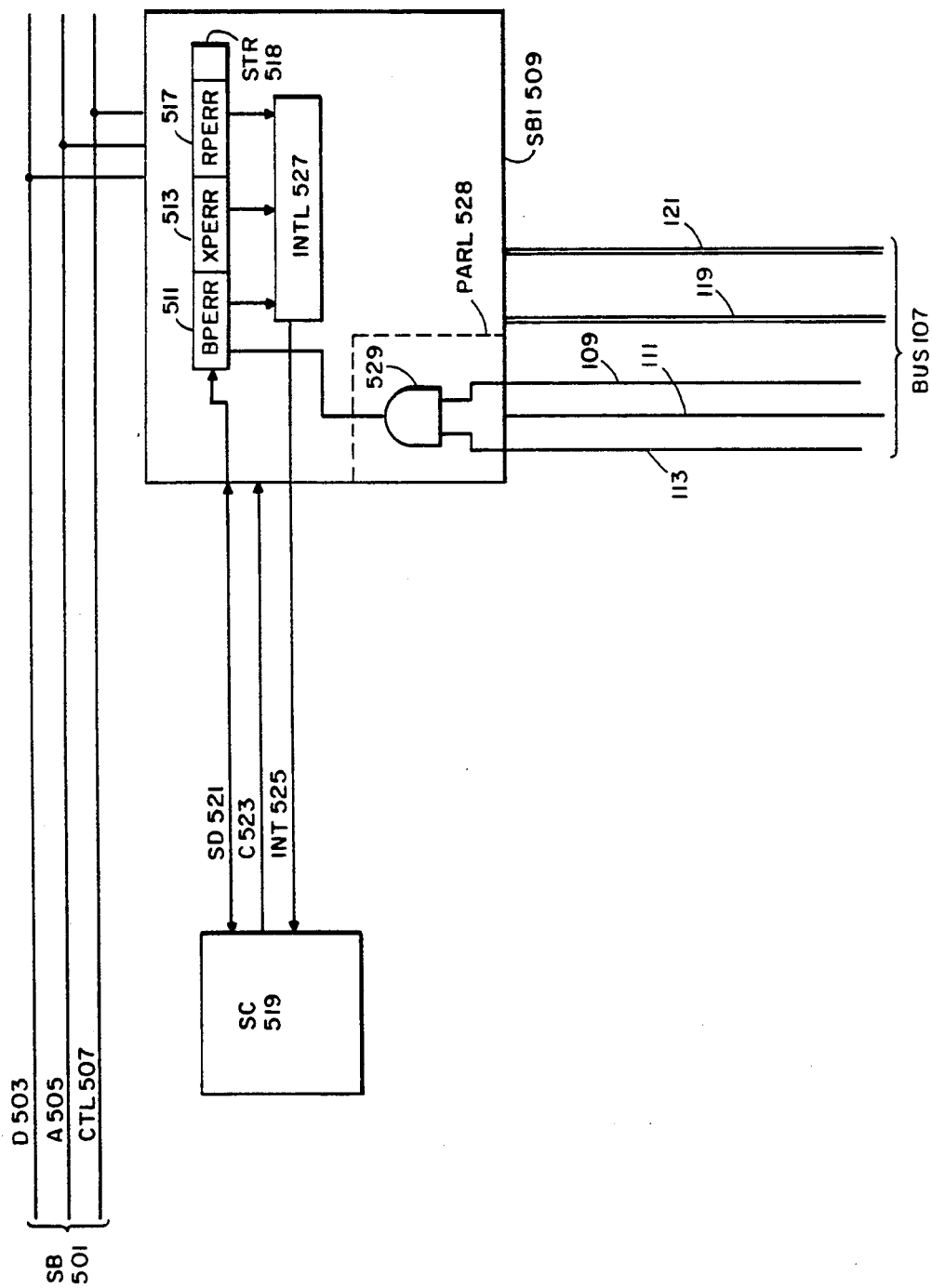
FIG. 5 is a block diagram of a system diagnostic interface in a digital computer system which employs the parity checking system.

4. A Diagnostic System Incorporating the Parity Checking System: FIG. 5

The parity checking system is employed in a preferred embodiment in a digital computer system of the type described in the above mentioned U.S. patent application Ser. No. 750,112. The use of the invention in such a system is shown in FIG. 5. In that figure, there are two busses: system bus (SB) 501, which connects non I/O components of the system, and which has data lines 503, address lines 505, and control lines 507, and bus 107, which connects I/O components of the system. System bus 501 and bus 107 are coupled to each other by means of system bus interface (SBI) 509, which accepts communications on bus 107 which are intended for components attached to system bus 501 and puts them into the proper form for communication on bus 501 and accepts communications on system bus 501 which are intended for an I/O device attached to bus 107 and puts them into the proper form for communication on bus 107. For example, when a device 103 or 105 writes to system memory connected to system bus 503, system bus interface 501 receives the address and two words of data transmitted by the device on bus 107 and outputs a corresponding memory command incorporating the address and the two words.

System bus interface 509 is also connected to system console 509, which is a microprocessor-based console for detecting, diagnosing, and to the extent possible, correcting system errors. The connection is by means of a serial bus having three parts: serial data lines 521, which transfer data between system console 519 and other components of the system, control lines 523, which indicate what kind of action is to be performed with the data, and interrupt line 525, which indicates to system console 519 that a component of the system requires intervention.

Like other devices on bus 107, the system bus interface may be a parity device 103 or a non parity device 105. System bus interface 509 shown in FIG. 5 is a parity device. It is thus connected to parity error line 109, parity line 111, and parity enable line 113 and produces and responds to signals on those lines in the same fashion as described above for parity devices 103. It consequently has parity logic 528 corresponding to parity logic 303 and status register 518 corresponding to status register 315. In status register 518, XPERR 513 corresponds in function to XPERR 319 and RPERR 517 to RPERR 321. Consequently, if a parity error occurs when system bus interface 509 transmits data to another parity device 103 or receives data from such a device 103, XPERR 513 or RPERR 517 is set, depending on the error. Additionally, status register 518 contains another register, bus parity error (BPERR) 511, which is set whenever any parity device 103 connected to bus 107 detects a parity error. The logic which sets BPERR 511 is represented in parity logic 528 as AND gate 529. The logic works to set BPERR 511 whenever a parity enable signal on PEN 113 is followed in the next bus cycle 205 by a parity error signal on parity error line 109.

When any of BPERR 511, XPERR 513, or RPERR 517 is set, interrupt logic (INTL) 527 responds thereto by generating an interrupt signal on interrupt line 525. System console 519 responds to the interrupt line by providing a command on command lines 523 to which system bus interface 509 responds by serially outputting the contents of status register 518 to system console 519. System console 519 reads the contents, takes whatever actions are necessary, and in the case of BPERR 511, XPERR 513, and RPERR 517 resets the registers by reloading them via serial data bus 521. The diagnostic interface thereby permits system console 519 to detect and deal with parity errors involving any two parity devices 103 connected to bus 107.

5. Conclusion

The foregoing detailed description of a preferred embodiment has shown how on skilled in the art may construct and use a system in which parity devices are connected to a bus together with non parity devices and has shown how such a system may be employed in a computer system having a system console for detecting, diagnosing, and dealing with system errors. Among the advantages of the system disclosed herein are the following:

Devices which generate parity and detect parity errors and those which do not may be used on the same bus.

Parity checking is pipelined, and therefore does not interfere with the speed of bus operation.

The detection of a parity error by any device attached to the bus may be indicated to a diagnostic system console.

The detailed description has disclosed a presently-preferred embodiment of the invention, but many other embodiments of the invention are possible. The preferred embodiment is thus exemplary and not restrictive and the scope of the appended claims is not limited to the embodiment disclosed therein, but includes any embodiment equivalent thereto.

What is claimed is:

1. A bus used in a digital computer system for transferring data between devices including one or more parity devices and one or more non-parity devices comprising:

one or more data lines connected to all of the devices for transferring a word of the data between a transmitting device of the devices and a receiving device thereof and parity lines connected only to the parity devices and including a parity enable line for transmitting a parity enable signal from a transmitting parity device indicating that the transmitting device is a parity device, a parity line for transmitting a parity signal from a transmitting parity device indicating the parity at the transmitting parity device of a word transferred on the data lines, and a parity error line for transmitting a parity error signal from a receiving parity device indicating whether the parity of the transferred word at the receiving parity devices as the same as the parity of the transferred word at the transmitting parity device, and wherein said bus further comprises a bus clock line connected to all of the devices for providing a bus clock signal for timing cycles of the bus and wherein:

the transmitting parity device places the word of data on the data lines in a first one of the cycles;

the transmitting parity device places the parity enable signal on the parity enable line in a second one of the cycles which immediately follows the first one of the cycles;

the transmitting parity device places the parity signal on the parity line in the second one of the cycles; and the receiving parity device places the parity error signal on the parity error line in a third one of the cycles immediately following the second one of the cycles.

2. The bus set forth in claim 1 and wherein:

each of the parity devices includes parity enable signal generating means operably connected to the parity enable line for operating when the parity device is transmitting the data word to generate the parity enable signal in the second one of the cycles;

parity generation means operably connected to the data lines for operating when the parity device is transmitting the data word to generate the parity of the transmitted data word in the first one of the cycles and operating when the parity device is receiving the data word to generate the parity of the received data word in the second one of the cycles;

parity signal providing means connected to the parity generation means and operably connected to the parity line for operating when the parity device has transmitted the data word to receive the parity of the transmitted word from the parity generation means and provide the parity signal to the parity line in the second one of the cycles; and parity error signal providing means connected to the parity generation means and operably connected to the parity line and to the parity error line for operating when the parity device is receiving the data word to receive the parity of the received data word from the parity generation means, receive the parity signal, compare the parity indicated by the parity signal and the parity received from the parity generation means, and generate the parity error signal in the third one of the cycles.

3. The bus set forth in claim 2 and wherein:

each of the parity devices further includes means for storing a transmit parity error bit, the transmit parity error bit being set when the parity device is the transmitting device and when the parity error signal indicates a parity error and means for storing a receive parity error bit, the receive parity error bit being set when the parity device is the receiving device and generates a parity error signal indicating that the parity of the transferred word at the receiving parity device was not the same as the parity of the transferred word at the transmitting parity device.

4. The bus set forth in claim 3 and wherein:

the digital computer system further includes a system bus, a system console, and a serial bus connected to the system console;

the serial bus includes a data line, a control line, and an interrupt line;

the parity devices includes a system bus interface device operably connected to the bus, the system bus, and the serial bus for interfacing the bus to the system bus;

the system bus interface device further includes means for storing a bus parity error bit, the means for storing the bus parity error bit being set to indicate a bus parity error whenever the parity error line carries a parity error signal indicating that the parity of a transferred word at a receiving parity device was not the same as the parity of the transferred word att he transmitting parity device, being connected to the serial bus data line, and operating to output the value of the bus parity error bit on the serial bus data line in response to signals on the serial bus control line and interrupt logic connected to the means for storing the bus parity error bit and to the serial bus interrupt line for generating an interrupt signal on the serial bus whenever the bus parity error bit is set to indicate a bus parity error; and the system console responds to the interrupt signal by providing a signal on the serial bus control line which causes the means for sorting the bus parity error bit to output the bit's value to the system data line.

5. Interface apparatus for interfacing a parity device to a bus for transferring data between devices including one or more parity devices and one or more non-parity devices comprising:

parity enable signal generating means operably coupled to a parity enable line of the bus for operating when the parity device has transmitted a data word to provide a parity enable signal indicating that the parity device is such to the parity enable line;

parity generation means operably coupled to data lines of the bus for generating the parity of data words provided to the data lines by the parity device or received from the data lines by the parity device;

parity signal providing means coupled to the parity generation means and operably coupled to a parity line of the bus for operating when the parity device has transmitted a data word to receive the parity of the transmitted data word from the parity generation means and provide a parity signal indicating the received parity on the parity line;

parity error signal providing means coupled to the parity generation means and operably coupled to the parity line, to the parity enable signal line, and to a parity error line of the bus for operating when the parity device is receiving a data word transmitted from another parity device to receive the parity of the received data word from the parity generation means and to respond to the parity enable signal and the parity signal by comparing the parity of the received data word with the parity indicated by the parity signal and generating a parity error signal on the parity error line if the indicated parity and the parity of the received data word do not match; and parity error signal receiving means operably coupled to the parity error line for operating when the parity device has transmitted a data word to receive any parity error signal generated by the parity error signal providing means of the other parity device upon receiving the transmitted data word; and wherein the bus includes a timing signal lines for defining bus cycles and each parity device is coupled to and responsive to the timing signal line for (a) transmitting the data word to the bus during a first bus cycle, (b) providing the parity enable signal and the parity signal to the bus during a second bus cycle and (c) generating the parity error signal, if required, during a third bus cycle.

6. The interface apparatus set forth in claim 5 and wherein:

the parity device interfaces to the bus by the interface apparatus includes means for storing a transmit parity error bit, the transmit parity error bit being set when the parity device is the transmitting device and when the parity error signal indicates a parity error; and means for storing a receive parity error bit, the receive parity error bit being set when the parity device is the receiving device and generates a parity error signal indicating that the parity of the transferred word at the receiving parity device was not the same as the parity of the transferred word at the transmitting parity device.

7. The interface apparatus set forth in claim 5 and wherein: the devices and the bus are part of a digital computer system which further includes a system bus, a system console, and a serial bus connected to the system console;

the serial bus includes a data line, a control line, and an interrupt line;

the parity device interfaced to the bus by the bus interface apparatus is a system bus interface device operably connected to the bus, the system bus, and the serial bus for interfacing the bus to the system bus;

the system bus interface device further includes means for storing a bus parity error bit, the means for storing the bus parity error bit being set to indicate a bus parity error whenever the parity error line carries a parity error signal indicating that the parity of a transferred word at a receiving parity device was not the same as the parity of the transferred word at the transmitting parity device, being connected to the serial bus data line, and operating to output the value of the bus parity error bit on the serial bus data line in response to signals on the serial bus control line and interrupt logic connected to the means for storing the bus parity error bit and to the serial bus interrupt line for generating an interrupt signal on the serial bus whenever the bus parity error bit is set to indicate a bus parity error; and the system console responds to the interrupt signal by providing a signal on the serial bus control line which causes the means for storing the bus parity error bit to output the bit's value to the system data line.

8. A bus used in a digital computer system for transferring data between parity devices which check parity comprising:

a bus clock line connected to all of the parity devices for providing a bus clock signal for timing cycles of the bus;

one or more data lines connected to all of the parity devices for transferring a word of data between a transmitting parity device of the parity devices and a receiving parity device of the parity devices; and parity lines connected to all of the parity devices, the parity lines including a parity line for transmitting a signal from a transmitting parity device, the transmitted signal indicating the parity at the transmitting parity device of a word of data transferred on the data lines, and a parity error line for transmitting a signal from a receiving parity device indicating whether the parity of the transferred word at the receiving parity device was the same as the parity of the transferred word at the transmitting parity device; and wherein the transmitting parity device places the word of data on the data lines in a first one of the cycles;

the transmitting parity device places the parity signal on the parity line in a second one of the cycles immediately following the first one of the cycles; and the receiving parity device places the parity error signal, if required, on the parity error line in a third one of the cycles immediately following the second one of the cycles; and wherein the bus further comprises a parity indication line for indicating, when asserted, that a device coupled to the bus and asserting the parity indication line is a parity device capable of generating a parity signal, and wherein the transmitting parity device asserts the parity indication signal line during the second one of the cycles immediately following the first one of the cycles.

* * * * *

UNITED STATES PATENT AND TRADEMARK OFFICE
CERTIFICATE OF CORRECTION

PATENT NO. : 5,155,735
DATED : October 13, 1992
INVENTOR(S) : Nash, et al

It is certified that error appears in the above-indentified patent and that said Letters Patent is hereby corrected as shown below:

```
In column 4, line 11, please change "ast" to --last--;
In column 5, line 30, please change "sam" to --same--;
In column 6, line 49, please change "bu" to --bus-- and "ar" to --are--;
In column 9, line 36, please change "ate" to --gate--; and
In column 11, line 15, please change "on" to --one--.
```

In claim 4, column 13, line 3, please change "att he" to --at the--, and in line 16, please change "sorting" to --storing--;

In claim 5, column 13, line 61, please change "lines" to --line--; and

In claim 6, column 14, line 3, please change "interfaces" to --interfaced--.

Signed and Sealed this

Twelfth Day of October, 1993

Attest:

BRUCE LEHMAN

*Attesting Officer*      *Commissioner of Patents and Trademarks*